US012613429B2

(12) United States Patent
Lee et al.

(10) Patent No.: US 12,613,429 B2
(45) Date of Patent: Apr. 28, 2026

(54) CAMERA MODULE

(71) Applicant: Samsung Electro-Mechanics Co., Ltd., Suwon-si (KR)

(72) Inventors: Iksun Lee, Suwon-si (KR); Jaekyung Kim, Suwon-si (KR); Hwanjun Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 181 days.

(21) Appl. No.: 18/361,225

(22) Filed: Jul. 28, 2023

(65) Prior Publication Data

US 2024/0210719 A1 Jun. 27, 2024

(30) Foreign Application Priority Data

Dec. 23, 2022 (KR) ........................ 10-2022-0183285

(51) Int. Cl.
*G03B 5/00* (2021.01)
*G02B 27/64* (2006.01)
(52) U.S. Cl.
CPC .............. *G02B 27/646* (2013.01); *G03B 5/00* (2013.01); *G03B 2205/0069* (2013.01)
(58) Field of Classification Search
CPC ........ G02B 7/18; G02B 7/1805; G02B 27/64; G02B 27/642; G02B 27/644;
(Continued)

(56) References Cited

U.S. PATENT DOCUMENTS

2016/0209672 A1 7/2016 Park et al.
2021/0048650 A1 2/2021 Yedid et al.
(Continued)

FOREIGN PATENT DOCUMENTS

CN 111142319 A 5/2020
KR 10-2016-0091579 A 8/2016
(Continued)

OTHER PUBLICATIONS

Korean Office Action Issued on Feb. 15, 2025, in Counterpart Korean Patent Application No. 10-2022-0183285 (4 Pages in English, 4 Pages in Korean).
(Continued)

*Primary Examiner* — Stephanie E Bloss
*Assistant Examiner* — Fang-Chi Chang
(74) *Attorney, Agent, or Firm* — NSIP Law

(57) ABSTRACT

A camera module is provided. The camera module includes a housing having an internal space; a folded module including a reflective member configured to change a path of light incident from the outside, and a movable holder on which the reflective member is mounted, the movable holder being disposed in the internal space and movably supported on an inner wall of the housing; a lens module including a lens barrel having a plurality of lenses aligned in an optical axis direction so that light reflected by the reflective member passes through the plurality of lenses; OIS driving magnets mounted on the movable holder; and OIS centering magnets provided adjacent to each other at a predetermined distance in a direction that intersects the OIS driving magnets, and disposed to apply magnetic forces to each other.

18 Claims, 5 Drawing Sheets

(58) Field of Classification Search
CPC ...... G02B 27/646; G02B 27/648; G03B 5/00;
G03B 5/02; G03B 5/04; G03B 5/06;
G03B 5/08; G03B 2205/0007; G03B
2205/0015; G03B 2205/0023; G03B
2205/003; G03B 2205/0053; G03B
2205/0069
See application file for complete search history.

(56)                    References Cited

U.S. PATENT DOCUMENTS

| | | |
|---|---|---|
| 2021/0294184 A1 | 9/2021 | Kim et al. |
| 2022/0221771 A1 | 7/2022 | Hur et al. |
| 2024/0231184 A1 | 7/2024 | Lee |

FOREIGN PATENT DOCUMENTS

| | | | | |
|---|---|---|---|---|
| KR | 10-2018-0009467 | A | 1/2018 | |
| KR | 10-2020-0135778 | A | 12/2020 | |
| KR | 10-2021-0132986 | A | 11/2021 | |
| KR | 10-2415478 | B1 | 7/2022 | |
| KR | 10-2022-0151403 | A | 11/2022 | |
| WO | WO-2022245055 | A1 * | 11/2022 | ........... G02B 7/1821 |

OTHER PUBLICATIONS

Korean Notice of Allowance issued on Oct. 16, 2025, in corresponding Korean Patent Application No. 10-2022-0183285. (1 page in English, 2 pages in Korean).

* cited by examiner

VI – VI'

CAMERA MODULE

CROSS-REFERENCE TO RELATED APPLICATION

This application claims the benefit under 35 USC § 119(a) of Korean Patent Application No. 10-2022-0183285 filed on Dec. 23, 2022 in the Korean Intellectual Property Office, the entire contents of which are incorporated herein by reference for all purposes.

BACKGROUND

1. Field

The following description relates to a camera module.

2. Description of Related Art

With the development of information communication technologies and semiconductor technologies, the use of electronic devices has rapidly increased. These electronic devices may converge various operations, and provide the converged operations without remaining in a traditional region.

Recently, cameras may be implemented in portable electronic devices such as, but not limited to, tablet personal computers (PCs) and laptop computers as well as smartphones. The camera of the portable electronic device may implement operations such as an autofocus (AF) operation, an image stabilizer (IS) operation, and a zoom operation, as only examples.

The image stabilizer operation may include both camera-shaking correction or hand-shaking correction, and may prevent an image of a subject to be captured from vibrating because of a photographer's inadvertent hand-shaking or camera-shaking in a state in which the camera is being moved or fixed.

The autofocus operation refers to an operation that acquires a clear image on an image formation plane of an image sensor by moving a lens, which is disposed forward of the image sensor, in an optical axis direction in accordance with a distance to or from the subject. The autofocus operation has been implemented on expensive electronic devices. However, the autofocus operation is now an essential operation that is installed even in a non-expensive low-end electronic devices.

Additionally, as high-performance camera modules are implemented, it is necessary to ensure reliability by mitigating impact and preventing abnormal noise between the lens and a counterpart mechanism in order to smoothly implement the autofocus operation, the image stabilizer operation, and the zoom operation.

The above information disclosed in this Background section is only for enhancement of understanding of the background of the disclosure, and therefore it may contain information that does not form the known prior art.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a housing having an internal space; a folded module comprising a reflective member configured to change a path of light incident from the outside, and a movable holder on which the reflective member is mounted, the movable holder being disposed in the internal space and movably supported on an inner wall of the housing; a lens module comprising a lens barrel having a plurality of lenses aligned in an optical axis direction so that light reflected by the reflective member passes through the plurality of lenses; optical image stabilization (OIS) driving magnets mounted on the movable holder; and OIS centering magnets provided adjacent to each other at a predetermined distance in a direction that intersects the OIS driving magnets, and disposed to apply magnetic forces to each other.

The OIS centering magnets may be supported on the housing.

A magnetic pole of the OIS driving magnets and a magnetic pole of the OIS centering magnets may be aligned, and may be disposed to apply repulsive forces to each other.

The OIS driving magnets may be respectively disposed at two opposite surfaces of the movable holder, and the OIS centering magnets include a pair of OIS centering magnets that may be fixed to one sidewall of the housing perpendicular to the optical axis and disposed symmetrically with respect to the optical axis.

The OIS driving magnets may extend in the optical axis direction, and the OIS centering magnets may be spaced apart from the OIS driving magnet in the optical axis direction.

The OIS driving magnets may be disposed to be farther from the optical axis in a direction perpendicular to the optical axis than a distance that the OIS centering magnets are disposed from the optical axis.

The OIS driving magnets may include a first OIS driving magnet configured to operate the movable holder along a first axis parallel to a direction in which the light is incident; and a second OIS driving magnet configured to operate the movable holder along a second axis perpendicular to the first axis and the optical axis, and wherein the first OIS driving magnet may be disposed closer to the OIS centering magnet, and may be disposed so that the first OIS driving magnet and the OIS centering magnet apply magnetic forces to each other.

The OIS centering magnets may be fixed by being inserted into a groove formed in an outer surface of one sidewall of the housing and opened outward.

Two opposite surfaces of the OIS centering magnets may be magnetized with two poles in the optical axis direction, and two opposite surfaces of the OIS driving magnets may be magnetized with two poles or multiple poles in a direction in which the light is incident, and a second axial direction perpendicular to the optical axis.

A lateral surface of the OIS centering magnets, where a polarization boundary is disposed, and a lateral surface of the OIS driving magnets, where a polarization boundary is disposed, may be disposed to be directed toward each other in a perpendicular direction.

The camera module may further include OIS driving coils, disposed to face the OIS driving magnets, and configured to apply electromagnetic forces to each other, wherein an intensity of a magnetic force applied between the OIS centering magnets and the OIS driving magnets may be lower than an intensity of an electromagnetic force applied between the OIS driving magnets and the OIS driving coils facing the OIS driving magnets.

In a general aspect, a camera module includes a housing including a first sidewall and a second sidewall that meet each other in a perpendicular direction; a reflective member configured to change a path of light incident from the outside; a movable holder on which the reflective member is mounted, the movable holder being supported to be movable in the housing; and a lens barrel having a lens aligned in an optical axis direction so that light reflected by the reflective member passes through the lens; optical image stabilization (OIS) driving magnets mounted on the movable holder, and disposed to be directed toward the first sidewall of the housing; and OIS centering magnets, supported on the second sidewall of the housing, and disposed so that the OIS centering magnets and the OIS driving magnets apply magnetic forces to one another.

The first sidewall and the second sidewall may have different lengths, the first sidewall may be a long-side sidewall parallel to the optical axis, and the second sidewall may be a short-side sidewall perpendicular to the optical axis.

The OIS driving magnets may be respectively disposed at two opposite surfaces of the movable holder, and the OIS centering magnets include a pair of OIS centering magnets fixed to the second sidewall, and disposed symmetrically with respect to a center of the second sidewall.

The OIS driving magnets may extend in parallel with the first sidewall, and the OIS centering magnets may be disposed to be spaced apart from the OIS driving magnets in the optical axis direction.

The OIS driving magnets may be disposed farther from the optical axis in a direction perpendicular to the optical axis than a distance that the OIS centering magnets are disposed from the optical axis.

In a general aspect, an electronic device includes a camera module, including a housing comprising first sidewalls parallel to an optical axis direction, and a second sidewall, perpendicular to the first sidewalls; a movable holder, on which a reflective member is mounted, disposed in an internal space of the housing; optical image stabilization (OIS) driving magnets disposed on the movable holder, and disposed to face the first sidewalls of the housing; and a plurality of OIS centering magnets, disposed on the second sidewall in a direction perpendicular to the optical axis direction, and disposed to face a direction that intersects a facing direction of the OIS driving magnets.

The OIS centering magnets may be disposed symmetrically with respect to the optical axis.

Other features and aspects will be apparent from the following detailed description, the drawings, and the claims.

Figure 1:
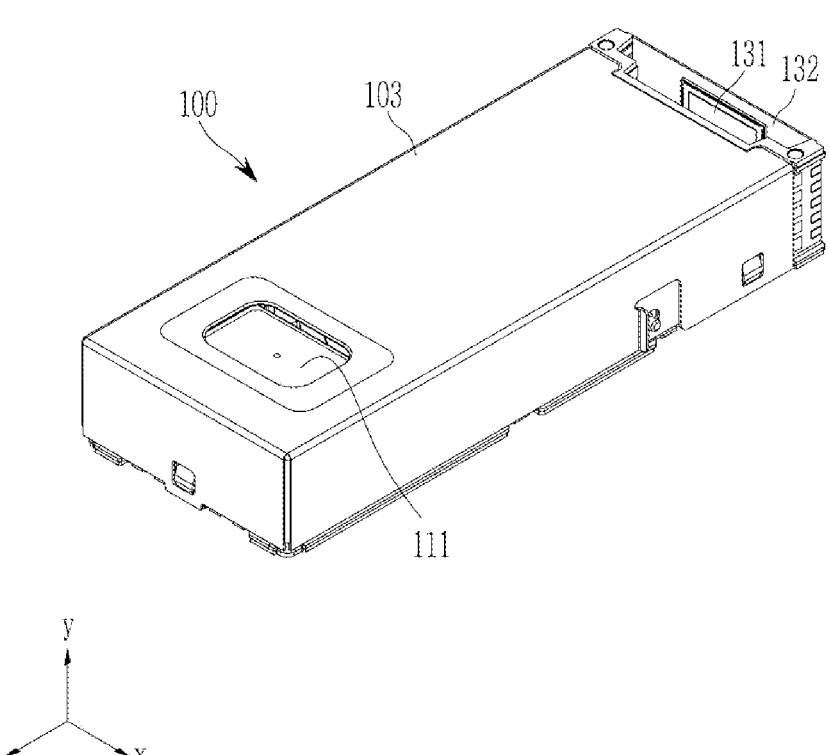
FIG. 1 illustrates a perspective view of an example camera module, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Throughout the specification, the word "in a plan view" means when an object is viewed from above, and the word "in a cross-sectional view" means when a cross section made by vertically cutting an object is viewed from a lateral side.

Additionally, throughout the specification, when one constituent element is referred to as being "connected to" another constituent element, one constituent element can be "directly connected to" the other constituent element, and one constituent element can also be "indirectly connected to," "physically connected to," or "electrically connected to" the other element with other elements therebetween. Further, the constituent elements are defined as different names according to positions or functions thereof, but the constituent elements may be integrated.

Throughout the specification, the term "optical axis" may be set as a central axis of a lens perpendicular to a lens surface to capture an image. The term "optical axis direction" means a direction parallel to the central axis. In the following drawings, the optical axis is set as the z-axis, and an x-axis and a y-axis are set in directions perpendicular to the optical axis. In this example, the x-axis and the y-axis are perpendicular to each other, an x-y plane is defined by the x-axis and the y-axis is a plane perpendicular to the optical axis.

One or more examples provide a camera module, in which a movable holder, which is configured to move in a housing, is kept centered in the module, which makes it possible to reduce a risk of a collision of the movable holder with a sidewall of a housing.

One or more examples may prevent a collision between the movable holder and the sidewall of the housing in the module, thereby reducing a risk of the occurrence of a mechanical collision abnormal noise, and foreign substances.

Figure 2:
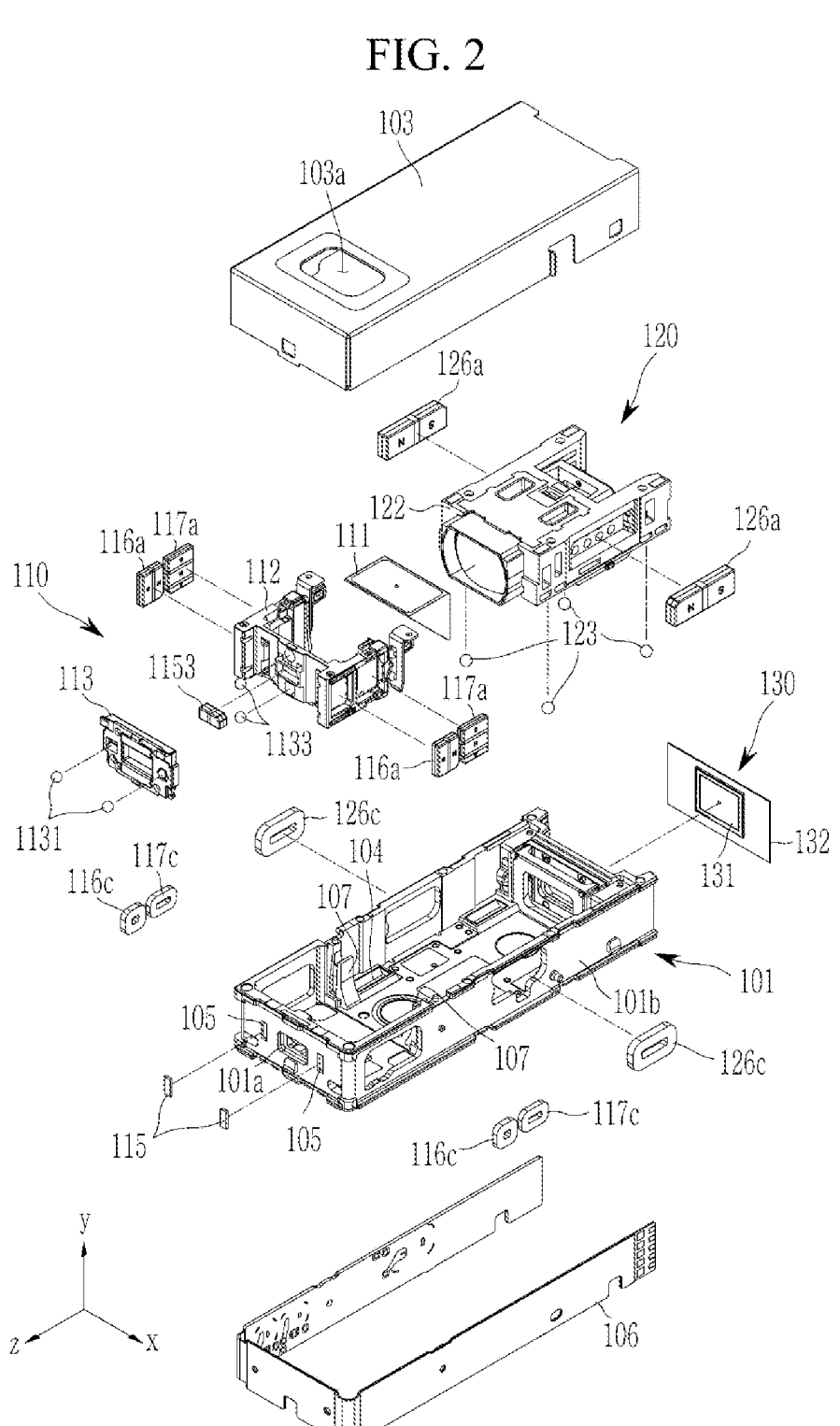
FIG. 2 illustrates an exploded perspective view of the example camera module illustrated in FIG. 1.

FIG. 1 illustrates a perspective view of an example camera module, in accordance with one or more embodiments, and FIG. 2 is an exploded perspective view of the example camera module illustrated in FIG. 1.

Referring to FIGS. 1 and 2, an example camera module 100, in accordance with one or more embodiments, may include a folded module 110, a lens module 120, and an image sensor module 130. The folded module 110 and the lens module 120 are accommodated in an internal space of a housing 101. A cover 103 constitutes a part of an external appearance of the camera module 100 while partially surrounding an upper portion and a lateral surface of the housing 101.

The folded module 110 may be configured to change a path of light incident from the outside. The light entering the interior of the camera through an opening portion 103*a* of the cover 103 may be reflected by the folded module 110 toward the lens module 120.

The folded module 110 may include a movable holder 112 on which a reflective member 111 is mounted. In an example, the reflective member 111 may be provided in the form of a prism or a mirror. The movable holder 112 may be supported by being in close contact with an inner wall surface of the housing 101 by an attractive force between a pulling yoke provided on the inner wall surface of the housing 101 and a pulling magnet 1153 provided on the movable holder 112. Further, a first ball bearing 1131, a rotary plate 113, and a second ball bearing 1133 may be provided between the inner wall surface of the housing 101 and the movable holder 112 and support the movable holder 112 when the movable holder 112 moves in the housing 101.

The lens module 120 includes a lens barrel 122 provided to be movable in the optical axis direction in the internal space of the housing 101, and having at least one lens therein. The light reflected by the folded module 110 is refracted while passing through the lens module 120. The light passing through the lens module 120 enters an image sensor 131. In an example in which that the lens module 120 includes a plurality of lenses, the plurality of lenses may be arranged in the optical axis direction.

The light passing through the lens module 120 enters an image sensor 131. In an example in which that the lens module 120 includes a plurality of lenses, the plurality of lenses may be arranged in the optical axis direction.

The image sensor module 130 may include the image sensor 131, and a circuit board 132 on which the image sensor 131 is mounted. An image is formed on an image formation surface (or an upper surface) of the image sensor 131. The image sensor 131 may create an image signal based on the formed image in response to the formed image. The image signal may be transmitted to an external circuit through the circuit board 132. The image sensor module 130 may further include an infrared ray blocking filter configured to filter out infrared rays entering from the lens module 120.

The camera module 100, in accordance with one or more embodiments, may provide, among others, an autofocus (AF) operation and an optical image stabilizer (OIS) operation.

The lens module 120 may adjust a focal length while reciprocating along the optical axis. An AF driving part may be disposed on a lateral portion of the lens module 120. AF driving magnets 126*a* may be mounted on the lens module 120, and AF driving coils 126*c* may be disposed at positions facing the AF driving magnets 126*a*. The lens module 120 may be moved along the optical axis based on an electromagnetic interaction between the AF driving coils 126*c* and the AF driving magnets 126*a*. The AF driving coils 126*c* are mounted on a substrate 106 attached to the housing 101. The housing 101 may have opening portions so that the AF driving coils 126*c* and the AF driving magnets 126*a* may face one another. The substrate 106 may include, as examples, a flexible printed circuit board (FPCB).

Rolling members 123 may be disposed between the lens module 120 and an inner bottom surface of the housing 101 to implement a smooth operation. The lens module 120 and the inner bottom surface of the housing 101 may include guide grooves 104 configured to partially accommodate the rolling members 123. The guide grooves 104 extend in a direction parallel to the optical axis, and a motion direction of the ball members 123 is limited to the extension direction (i.e., the optical axis direction) of the guide grooves 104.

As the folded module 110 rotates about an axis perpendicular to the optical axis, the optical image stabilizer (OIS) operation, i.e., a swaying or handshake correction operation may be implemented. The folded module 110 may include an OIS driving part configured to rotate the reflective member 111 relative to the housing 101 about the axis perpendicular to the optical axis. The OIS driving part may include a first OIS driving part configured to rotate the reflective member 111 about a first axis perpendicular to the optical axis, and a second OIS driving part configured to rotate the reflective member 111 about a second axis perpendicular to the optical axis and intersecting the first axis. In this example, the first axis is an axis that meets the optical axis and is parallel to a light incident direction in which light is incident from the outside. The second axis is an axis that meets the optical axis and is perpendicular to the optical axis direction and the light incident direction. Therefore, the optical axis may be parallel to the z-axis in the drawings, the first axis may be parallel to the y-axis in the drawings, and the second axis may be parallel to the x-axis in the drawings.

The OIS driving part may rotate the reflective member 111 about the first axis and/or the second axis, thereby optically correcting swaying or handshaking of an image formed on the image sensor 131 caused by swaying of the camera module 100. Accordingly, the OIS driving part may generate driving power that enables the movable holder 112 to rotate about two axes.

The OIS driving part includes a plurality of OIS driving magnets 116a and 117a and a plurality of OIS driving coils 116c and 117c disposed to face the plurality of OIS driving magnets 116a and 117a. When power is applied to the plurality of OIS driving coils 116c and 117c, the movable holder 112 on which the plurality of OIS driving magnets 116a and 117a is mounted may be rotated about the first axis and/or the second axis by electromagnetic interactions between the plurality of OIS driving magnets 116a and 117a and the plurality of OIS driving coils 116c and 117c.

The first OIS driving part may include the first OIS driving magnets 116a and the first OIS driving coils 116c, and rotate the movable holder 112 about the first axis. The second OIS driving part may include the second OIS driving magnets 117a and the second OIS driving coils 117c, and rotate the movable holder 112 about the second axis.

The plurality of OIS driving magnets 116a and 117a may be mounted on two opposite surfaces of the movable holder 112. In this example, the first OIS driving magnet 116a may be disposed closer to the rotary plate 113 than the second OIS driving magnet 117a to the rotary plate 113. That is, the first OIS driving magnet 116a may be disposed closer to the sidewall of the housing 101, to which the rotary plate 113 is fixed, than the second OIS driving magnet 117a to the sidewall of the housing 101.

In the one or more examples, OIS centering magnets 115 may be disposed on one sidewall of the housing 101. The OIS centering magnets 115 may be disposed adjacent to each other at distances from the OIS driving magnets 116a and 117a to apply magnetic forces to each other. Therefore, even when no driving power is applied, the OIS centering magnets 115 may interact with the OIS driving magnets 116a and 117a and maintain the movable holder 112 so that the movable holder 112 is not shifted toward any one side in the housing 101.

The plurality of OIS driving coils 116c and 117c may be mounted on the housing 101. In an example, the plurality of OIS driving coils 116c and 117c may be mounted on the housing 101 based on the substrate 106. That is, the plurality of OIS driving coils 116c and 117c may be provided on the substrate 106, and the substrate 106 may be mounted on the housing 101. In this example, the drawings illustrate an example in which the substrate 106 is provided as one piece as a whole so that the coils for the folded module 110 and the coils for the lens module 120 may all be mounted on the substrate 106. However, in n example, the substrate 106 may be divided into two or more substrates so that the coils for the folded module 110 and the coils for the lens module 120 are respectively mounted on the two or more substrates.

The internal space of the housing 101 may be divided by protruding walls 107 into a space in which the folded module 110 is disposed and a space in which the lens module 120 is disposed. That is, the folded module 110 may be provided forward of the protruding walls 107, and the lens module 120 may be provided rearward of the protruding walls 107. In an example, the protruding walls 107 may have shapes that partially protrude toward the internal space of the housing 101 from two opposite inner walls of the housing 101.

Figure 3:
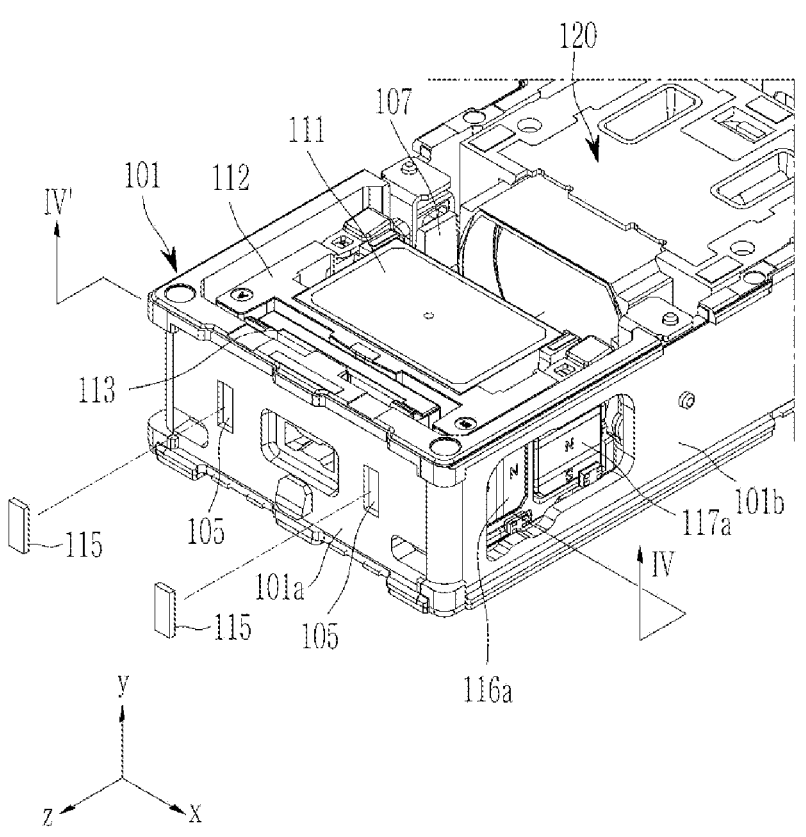
FIG. 3 illustrates a perspective view of a part of the example camera module illustrated in FIG. 1 from which a cover is removed.
Figure 4:
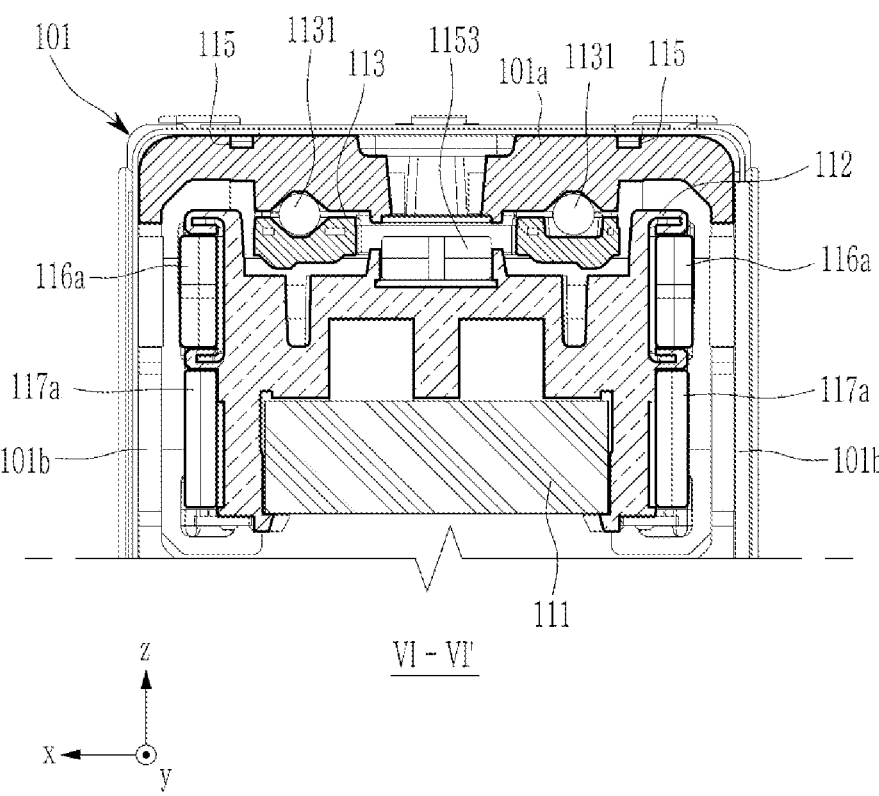
FIG. 4 illustrates a cross-sectional view taken along line IV-IV' in FIG. 3.

FIG. 3 illustrates a perspective view of a part of the camera module illustrated in FIG. 1 from which a cover is removed, and FIG. 4 illustrates a cross-sectional view taken along line IV-IV' in FIG. 3.

Referring to FIG. 3, in the camera module 100, in accordance with one or more embodiments, the OIS centering magnets 115 may be disposed on an outer surface of one sidewall of the housing 101 and provided adjacent to each other at a distance in a direction intersecting the OIS driving magnets 116a and 117a. The housing 101 may include a bottom surface perpendicular to the light incident direction, and sidewalls 101a and 101b perpendicular to the bottom surface. The sidewalls 101a and 101b of the housing 101 may include short-side sidewalls 101a perpendicular to the optical axis, and long-side sidewalls 101b parallel to the optical axis. The OIS centering magnets 115 may be mounted on the short-side sidewall 101a. In this example, the OIS centering magnets 115 include a pair of OIS centering magnets 115 symmetrically disposed with respect to the optical axis. The pair of OIS centering magnets 115 may be respectively disposed at two opposite sides based on the second axial direction (the x-axis direction in the drawings) based on the center of the short-side sidewall 101a of the housing 101.

In an example, the OIS centering magnets 115 may be fixed into grooves 105 formed in the short-side sidewall 101a of the housing 101. The groove 105 may be formed in an outer surface of the short-side sidewall 101a and has a shape that is opened in an outward direction. The OIS centering magnets 115 may be fixed by being inserted into the grooves 105 from the outside of the housing 101. The OIS centering magnets 115 may each have an approximately rectangular parallelepiped shape that is elongated vertically. In an example, the grooves 105 may also be formed as debossed portions corresponding to the OIS centering magnets 115 and may be fitted with the OIS centering magnets 115.

The OIS driving magnets 116a and 117a include a pair of OIS driving magnets 116a and 117a respectively disposed on two opposite surfaces of the movable holder 112. That is, the first OIS driving magnets 116a include a pair of first OIS driving magnets 116a respectively disposed on the two opposite surfaces of the movable holder 112. The second OIS driving magnets 117*a* include a pair of second OIS driving magnets 117*a* disposed on the two opposite surfaces of the movable holder 112.

In the one or more examples, the first OIS driving magnet 116*a* may be disposed closer to the short-side sidewall 101*a* of the housing 101 than the second OIS driving magnet 117*a* to the short-side sidewall 101*a*. Therefore, the OIS centering magnet 115 may be disposed closer to the first OIS driving magnet 116*a* than the second OIS driving magnet 117*a* to the first OIS driving magnet 116*a*. In this example, the OIS centering magnet 115 and the first OIS driving magnet 116*a* may apply magnetic forces to each other.

In the one or more embodiments, the OIS centering magnet 115 is disposed closer to the first OIS driving magnet 116*a*, and the OIS centering magnet 115 and the first OIS driving magnet 116*a* may apply the magnetic forces to each other. However, the position of the first OIS driving magnets 116*a* and the position of the second OIS driving magnets 117*a* may be changed, such that the second OIS driving magnet 117*a* may be disposed closer to the OIS centering magnets 115. This configuration also belongs to the scope of the present disclosure.

In a non-limiting example, the OIS driving magnets 116*a* and 117*a* may extend in the optical axis, and may be expanded in the light incident direction. The housing 101 has the long-side sidewalls 101*b* that are parallel to the optical axis and perpendicular to the bottom surface of the housing 101. The OIS driving magnets 116*a* and 117*a* may be disposed to face the long-side sidewalls 101*b* of the housing 101. In this example, the OIS centering magnets 115 may be spaced apart from the OIS driving magnets 116*a* and 117*a* in the optical axis direction. The OIS centering magnets 115 may be disposed on the short-side sidewall 101*a* of the housing 101, and the movable holder 112 may be spaced apart from the short-side sidewall 101*a* of the housing 101, such that the OIS driving magnets 116*a* and 117*a* mounted on the movable holder 112 are spaced apart from the OIS centering magnets 115 at predetermined distances.

In a non-limiting example, the OIS driving magnets 116*a* and 117*a* may be disposed farther from the optical axis in the direction perpendicular to the optical axis than a distance in which the OIS centering magnets 115 are disposed from the optical axis. That is, in a plan view, the OIS driving magnets 116*a* and 117*a* may be disposed outward of the OIS centering magnets 115 based on the optical axis. Therefore, it is possible to ensure a space in which a magnetic field may be formed between the OIS centering magnets 115 and the OIS driving magnets 116*a* and 117*a*.

Figure 5:
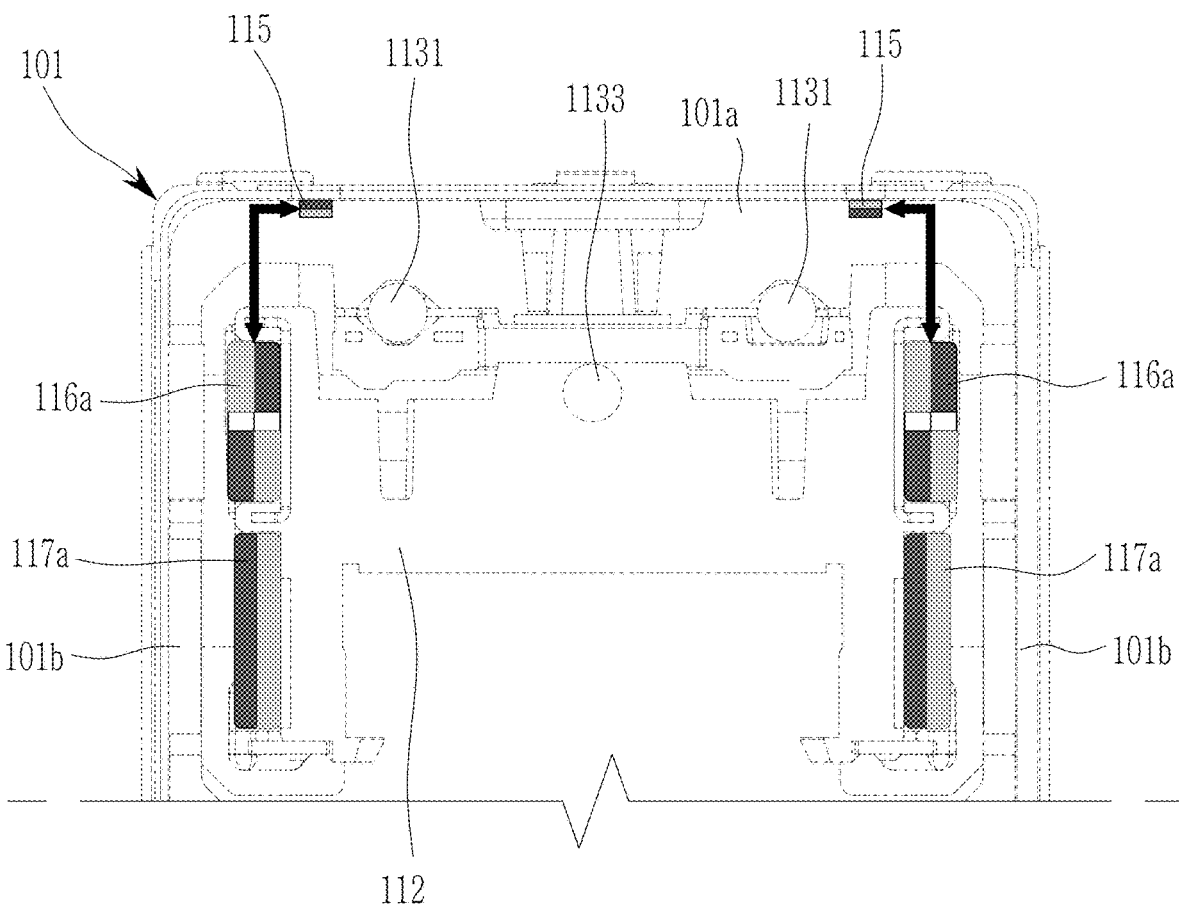
FIG. 5 illustrates a view of example operations of an OIS driving magnet and an OIS centering magnet of the example camera module illustrated in FIG. 3.
Figure 5:
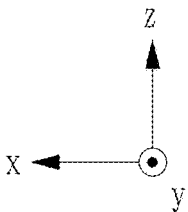

FIG. 5 is a view schematically illustrating and explaining operations of the OIS driving magnet and the OIS centering magnet of the camera module illustrated in FIG. 3.

Referring to FIG. 5, in the example camera module 100, in accordance with one or more embodiments, the two opposite surfaces of each of the OIS centering magnets 115 may be magnetized with two poles in the optical axis direction (the z-axis direction in the drawings), and the two opposite surfaces of each of the OIS driving magnets 116*a* and 117*a* may be magnetized with two poles or multiple poles in the second axial direction (the x-axis direction in the drawings). That is, the OIS centering magnet 115 may have the N-pole and the S-pole in the optical axis direction, and the OIS driving magnets 116*a* and 117*a* may each have the N-pole and the S-pole in the second axial direction.

In a non-limiting example, the OIS centering magnets 115 may be disposed adjacent to the OIS driving magnets 116*a* and 117*a* in the directions intersecting each other. That is, the lateral surfaces of the magnets, where the polarization boundaries are disposed, may be disposed to face one another in the perpendicular direction and apply magnetic forces to one another. Therefore, when magnetic poles of the OIS centering magnets 115 and the OIS driving magnets 116*a* and 117*a*, which face one another in the directions intersecting each other, are equal to one another, the OIS centering magnets 115 and the OIS driving magnets 116*a* and 117*a* apply repulsive forces to one another in the arrow direction indicated in the drawings.

Referring to FIG. 5, the OIS centering magnet 115 and the first OIS driving magnet 116*a*, which are disposed adjacent to each other, are disposed so that the surfaces directed toward the internal space of the housing 101 have the same magnetic poles. Therefore, the lateral surfaces of the magnets, where the polarization boundaries are disposed, are disposed so that the same poles face each other, such that the OIS centering magnets 115 and the first OIS driving magnets 116*a* apply the repulsive forces to one another.

The movable holder 112 may come into close contact with the inner surface of the sidewall of the housing 101, and may rotate about the second ball bearing 1133 provided between the rotary plate 113 and the movable holder 112. The OIS driving magnets 116*a* and 117*a* may be mounted on the two opposite surfaces based on the second axial direction of the movable holder 112, and operate the movable holder 112 based on the electromagnetic interaction with the OIS driving coils 116*c* and 117*c* facing the OIS driving magnets 116*a* and 117*a*.

In an example, the OIS centering magnets 115 may be disposed symmetrically at the two opposite sides of the short-side sidewall 101*a* based on the second ball bearing 1133, and may be disposed to correspond to the first OIS driving magnets 116*a* disposed at the two opposite surfaces of the movable holder 112. Therefore, the OIS centering magnets 115 may interact with the first OIS driving magnets 116*a* at the two opposite sides of the movable holder 112, such that the movable holder 112 may be disposed at the central portion without being shifted toward any one side.

In an example, when power is not applied to the OIS driving coils 116*c* and 117*c*, the driving power may be lost, such that the movable holder 112 may be freely moved in the camera module by an external force such as gravity, without being controlled. However, in the one or more embodiments, although power is not applied to the OIS driving coils 116*c* and 117*c*, the OIS centering magnets 115 may at least apply the magnetic forces to the first OIS driving magnets 116*a*, thereby preventing the movable holder 112 from being excessively shifted toward any one side. Therefore, it is possible to prevent the movable holder 112 from colliding with the sidewalls 101*a* and 101*b* of the housing 101 and prevent the movable holder 112 from colliding with the bottom surface of the housing 101 or the inner surface of the cover 103.

In an example, the intensity of the magnetic force applied between the OIS centering magnet 115 and the first OIS driving magnet 116*a* may be lower than the intensity of the electromagnetic force applied between the first OIS driving magnet 116*a* and the first OIS driving coil 116*c*. Therefore, when the first OIS driving coil 116*c* is operated by applied power, it is possible to overcome the influence made by the OIS centering magnet 115 and control the motion of the movable holder 112.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a housing having an internal space;
a folded module comprising a reflective member configured to change a path of light incident from the outside, and a movable holder on which the reflective member is mounted, the movable holder being disposed in the internal space and movably supported on an inner wall of the housing;
a lens module comprising a lens barrel having a plurality of lenses aligned in an optical axis direction so that light reflected by the reflective member passes through the plurality of lenses;
optical image stabilization (OIS) driving magnets mounted on the movable holder; and
a pair of OIS centering magnets provided on a side of the housing perpendicular to the optical axis, and disposed at a predetermined distance symmetrically with respect to the optical axis in a direction that intersects the OIS driving magnets, and disposed to apply magnetic forces to the OIS driving magnets.

2. The camera module of claim 1, wherein:
the OIS centering magnets are supported on the housing.

3. The camera module of claim 1, wherein:
a magnetic pole of the OIS driving magnets and a magnetic pole of the OIS centering magnets are aligned, and are disposed to apply repulsive forces to each other.

4. The camera module of claim 1, wherein:
the OIS driving magnets are respectively disposed at two opposite surfaces of the movable holder.

5. The camera module of claim 4, wherein:
the OIS driving magnets extend in the optical axis direction, and
the OIS centering magnets are spaced apart from the OIS driving magnet in the optical axis direction.

6. The camera module of claim 1, wherein:
the OIS driving magnets are disposed to be farther from the optical axis in a direction perpendicular to the optical axis than a distance that the OIS centering magnets are disposed from the optical axis.

7. The camera module of claim 1, wherein:
the OIS driving magnets comprise:
a first OIS driving magnet configured to operate the movable holder along a first axis parallel to a direction in which the light is incident; and
a second OIS driving magnet configured to operate the movable holder along a second axis perpendicular to the first axis and the optical axis, and
wherein the first OIS driving magnet is disposed closer to the OIS centering magnet, and is disposed so that the first OIS driving magnet and the OIS centering magnet apply magnetic forces to each other.

8. The camera module of claim 1, wherein:
the OIS centering magnets are fixed by being inserted into a groove formed in an outer surface of one sidewall of the housing and opened outward.

9. The camera module of claim 1, wherein:
two opposite surfaces of the OIS centering magnets are magnetized with two poles in the optical axis direction, and
two opposite surfaces of the OIS driving magnets are magnetized with two poles or multiple poles in a direction in which the light is incident, and a second axial direction perpendicular to the optical axis.

10. The camera module of claim 9, wherein:
a lateral surface of the OIS centering magnets, where a polarization boundary is disposed, and a lateral surface of the OIS driving magnets, where a polarization boundary is disposed, are disposed to be directed toward each other in a perpendicular direction.

11. The camera module of claim 1, further comprising:
OIS driving coils, disposed to face the OIS driving magnets, and configured to apply electromagnetic forces to each other,
wherein an intensity of a magnetic force applied between the OIS centering magnets and the OIS driving magnets is lower than an intensity of an electromagnetic force applied between the OIS driving magnets and the OIS driving coils facing the OIS driving magnets.

12. A camera module comprising:
a housing comprising first sidewalls and a second sidewall that meet each other in a perpendicular direction;
a reflective member configured to change a path of light incident from the outside;
a movable holder on which the reflective member is mounted, the movable holder being supported to be movable in the housing; and
a lens barrel having a lens aligned in an optical axis direction so that light reflected by the reflective member passes through the lens;
optical image stabilization (OIS) driving magnets mounted on the movable holder, and disposed to be directed toward the first sidewalls of the housing; and
OIS centering magnets, supported on the second sidewall of the housing, and disposed so that the OIS centering magnets and the OIS driving magnets apply magnetic forces to one another.

13. The camera module of claim 12, wherein:
the first sidewall and the second sidewall have different lengths,
the first sidewall is a long-side sidewall parallel to the optical axis, and the second sidewall is a short-side sidewall perpendicular to the optical axis.

14. The camera module of claim 12, wherein:
the OIS driving magnets are respectively disposed at two opposite surfaces of the movable holder, and
the OIS centering magnets comprise a pair of OIS centering magnets fixed to the second sidewall, and disposed symmetrically with respect to a center of the second sidewall.

15. The camera module of claim 12, wherein:
the OIS driving magnets extend in parallel with the first sidewall, and
the OIS centering magnets are disposed to be spaced apart from the OIS driving magnets in the optical axis direction.

16. The camera module of claim 12, wherein:
the OIS driving magnets are disposed farther from the optical axis in a direction perpendicular to the optical axis than a distance that the OIS centering magnets are disposed from the optical axis.

17. An electronic device, comprising:

a camera module, comprising:

a housing comprising first sidewalls parallel to an optical axis direction, and a second sidewall, perpendicular to the first sidewalls;

a movable holder, on which a reflective member is mounted, disposed in an internal space of the housing;

optical image stabilization (OIS) driving magnets disposed on the movable holder, and disposed to face the first sidewalls of the housing; and a plurality of OIS centering magnets, disposed on the second sidewall in a direction perpendicular to the optical axis direction, and disposed to face a direction that intersects a facing direction of the OIS driving magnets.

18. The electronic device of claim 17, wherein the OIS centering magnets are disposed symmetrically with respect to the optical axis.

* * * * *